H. B. VAIL.
PLOW FENDER.
APPLICATION FILED AUG. 11, 1911.
1,005,372.
Patented Oct. 10, 1911.
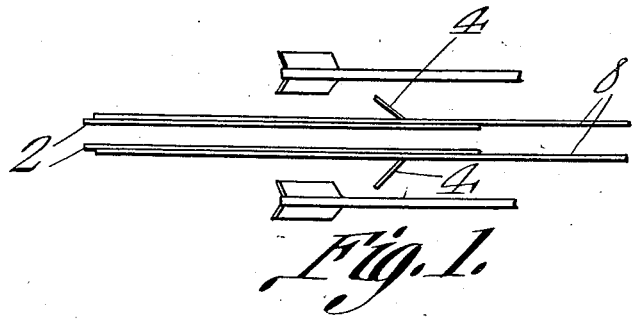
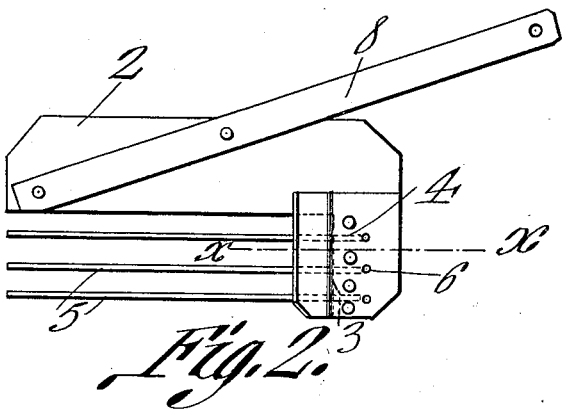
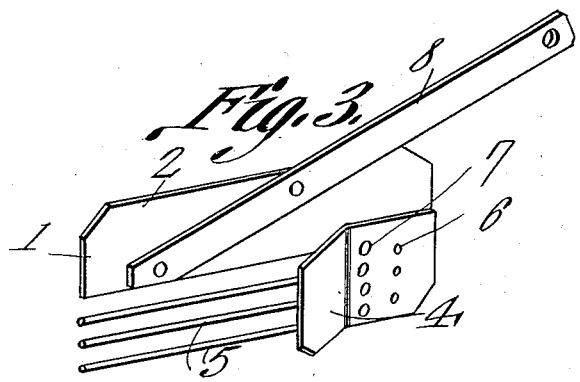
Witnesses
Inventor
H. B. Vail
by C. A. Snow & Co.
Attorneys

UNITED STATES PATENT OFFICE.

HENRY B. VAIL, OF ARLINGTON, OHIO, ASSIGNOR OF ONE-HALF TO ALBERT GAY, OF ARLINGTON, OHIO.

PLOW-FENDER.

1,005,372.  Specification of Letters Patent.  Patented Oct. 10, 1911.

Application filed August 11, 1911. Serial No. 643,550.

*To all whom it may concern:*

Be it known that I, HENRY B. VAIL, a citizen of the United States, residing at Arlington, in the county of Hancock and State of Ohio, have invented a new and useful Plow-Fender, of which the following is a specification.

This invention relates to improvements in plows generally, more especially fenders therefor.

The invention has for its object to provide for the suitable cultivation, particularly of small plants, as corn and vegetables and the like.

A further object is to protect the plants from injury while performing the plowing operation.

A still further object is to provide for disposing of the clods resulting from the plowing operation upon both sides of the plow.

A still further object is to carry out the aforesaid ends in a simple, expeditious and effective manner.

The invention consists of certain instrumentalities and features substantially as hereinafter fully disclosed and defined by the claims.

In the accompanying drawing, illustrating the preferred embodiment of the invention wherein it will be understood that various changes and modifications may be made as relates to the detailed construction and arrangement of the parts without departing from the spirit of our invention, Fig. 1 is a plan view, somewhat diagrammatic, of the invention. Fig. 2 is a detailed side view of the same. Fig. 3 is a detached perspective of the invention. Fig. 4 is a section produced upon the line X—X of Fig. 2.

In carrying out our invention we provide a fender or guard at each side of the plow for throwing the clods, &c. from the plants at both sides, as requisite for the effective protection of the plants, each fender or guard being designated generally as 1.

A fender or guard includes a preferably upper imperforate plate-portion 2, with a depending right-angled extension 3 at its forward end, to which extension is suitably secured, preferably as shown, a wing or deflector 4 for disposing of clods resulting from the plowing operation, to prevent the same from injuring the plants, as in cultivating corn, or other vegetables, &c., during their early stages, as will be readily appreciated. A fender further includes a plurality of rod-like members or fingers 5 disposed one above the other in vertical alinement and suitably spaced apart, whereby the fine soil or earth may be unobstructed in its return or passage to and around the plants as desired, and yet any clods or larger pieces of earth, escaping the deflector or wing 4 may be excluded from said plants, as will be readily understood.

The fingers or rod-like members are interposed or received between, and have their forward fixed ends laterally bent and passed through the vertical extension 3 of the member 2 and through the deflector or wing 4, where the latter joins, or is secured to said extension, said laterally bent portions of said fingers then being hammered or riveted down upon said wing or deflector as at 6. This constitutes a preferable way of securing said fingers in place, the same also aiding to secure the deflector or wing in position upon the member 2 of the fender, said deflector also being secured to the latter by suitably riveting intermediate the fingers 5, as at 7.

The fender is secured to the plow-beam in any suitable way, preferably by means of an inclined arm or member 8 fixed to the plate or imperforate portion 2 of said fender and to the said plow-beam, respectively, also in any suitable way.

This device, it will be noted is extremely simple and inexpensive of manufacture and yet highly effective for its purpose, as doubtless has been made manifest from the foregoing disclosure.

What is claimed is:

1. A fender including a plurality of fingers and a deflector secured laterally of said fender and at its forward end.

2. A fender including a member having a depending portion and a deflector, also secured to said depending portion and a plurality of fingers having their forward end-portions interposed between said depending portion and said deflector, the forward ends of said fingers being laterally passed through said deflector and riveted down thereon.

In testimony that I claim the foregoing as my own, I have hereto affixed my signature in the presence of two witnesses.

HENRY B. VAIL.

Witnesses:
N. D. STEIN,
WILLIAM H. SMITH.

Copies of this patent may be obtained for five cents each, by addressing the "Commissioner of Patents, Washington, D. C."